United States Patent [19]

Ohashi

[11] Patent Number: 4,611,756
[45] Date of Patent: Sep. 16, 1986

[54] CONTROLLER FOR FAN MOTOR OF AIR CONDITIONER

[75] Inventor: Toshio Ohashi, Atsugi, Japan

[73] Assignee: Nissan Motor Co., Ltd., Yokohama, Japan

[21] Appl. No.: 686,703

[22] Filed: Dec. 27, 1984

[30] Foreign Application Priority Data

Dec. 29, 1983 [JP] Japan .................. 58-251427

[51] Int. Cl.$^4$ .................................... F24F 7/00
[52] U.S. Cl. ............................ 236/49; 236/38; 98/2.01
[58] Field of Search ............ 236/49, 38, DIG. 9; 237/12.3 A, 2 A; 98/2.01, 2.05, 2.0; 165/16, 40, 41, 42, 43; 62/239, 244

[56] References Cited

U.S. PATENT DOCUMENTS

| 3,829,010 | 8/1974 | Jones | 236/49 |
| 4,272,015 | 6/1981 | Houser | 236/49 |

FOREIGN PATENT DOCUMENTS

| 0002210 | 1/1981 | Japan | 98/2 |
| 0089411 | 5/1983 | Japan | 165/43 |
| 0038114 | 3/1984 | Japan | 98/2 |

Primary Examiner—Harry Tanner
Attorney, Agent, or Firm—Schwartz, Jeffery, Schwaab, Mack, Blumenthal & Evans

[57] ABSTRACT

A controller for a fan motor of an air conditioner in a vehicle according to the present invention is constructed to control the magnitude of a stream of air sent from an electric fan into a room of the vehicle so that the magnitude of a stream of air is reduced when a temperature of the outside air of the room falls down below a predetermined temperature in the heating mode of the air conditioner.

10 Claims, 4 Drawing Figures

CONTROLLER FOR FAN MOTOR OF AIR CONDITIONER

TECHNICAL FIELD OF THE INVENTION

The present invention relates to a controller for a fan motor of an air conditioner in a vehicle, and more particularly to a controller for driving an electric motor which drives an electric blowing fan to send air into a room of a vehicle.

BACKGROUND OF THE INVENTION

A fan motor of an air conditioner in a vehicle is driven by a controller so that the magnitude of a stream of air which is sent into a room of a vehicle can be adjusted in several steps from a weak stream of air to a powerful stream of air. The adjustment of the magnitude can be manually made by using a fan switch such as a rotary switch. However, when the air conditioner is operated in a heating mode and the fan switch has been switched, the controller drives the electric fan through the fan motor to send out a powerful stream of air into the room of the vehicle. Then, if a temperature of the outside air of the vehicle falls down to a cold temperature, the cold outside air is drawn into the room of the vehicle by operation of the electric fan together with warm air from a heater.

Consequently, a temperature in the room is reduced and a desired room temperature can not be obtained. Therefore, in order to obtain the desired room temperature in that condition, it is necessary to manually operate the fan switch so that the controller drives the fan through the fan motor to send out a weak stream of air into the room. Such a manual operation of the switch is troublesome.

SUMMARY OF THE INVENTION

It is an object of the present invention to provide an improved controller for a fan motor of an air conditioner in a vehicle in which a desired temperature in a room of the vehicle is always obtained without reducing the room temperature even when a temperature of the air outside of the room falls down.

It is another object of the present invention to provide a controller for a fan motor of an air conditioner in a vehicle in which the magnitude of a stream of air sent into the room is reduced so that the room temperature of the vehicle is not decreased when a temperature outside the room falls down.

In accordance with the present invention, there is provided a controller for a fan motor of an air conditioner in a vehicle in which the fan motor drives a blowing fan to send air into a room of the vehicle. The controller comprises adjusting means for changing the revolution of the motor so that the magnitude of a stream of air sent from the fan can be adjusted in a range from a powerful stream of air to a weak stream of air, detection means for sensing a temperature of the air outside the room, and control means for controlling to reduce the magnitude of a stream of air from the fan when the detection means detects that the temperature of the outside air falls down below a predetermined temperature.

The foregoing and other objects, features and advantages of the present invention as well as a presently preferred embodiment thereof will be more apparent from a reading of the following description in connection with the accompanying drawings.

DESCRIPTION OF THE PREFERRED EMBODIMENTS

To facilitate the understanding of the present invention, a brief reference will be made to a prior art controller for a fan motor of an air conditioner in a vehicle illustrated in FIG. 1.

Figure 1:
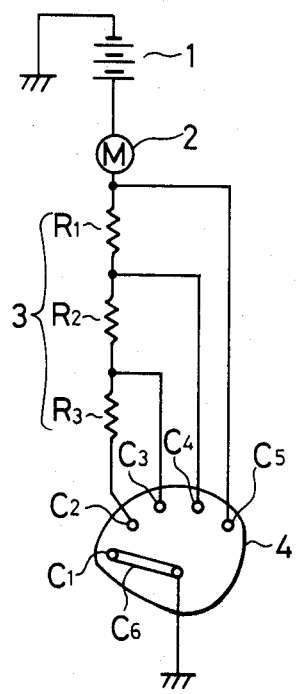
FIG. 1 is a circuit diagram of a prior art controller for a fan motor of an air conditioner in a vehicle.

As shown in FIG. 1, a fan motor 2 for driving an electric blowing fan which send out air into a room of the vehicle is connected at its plus side terminal to the positive pole of a power supply 1 and a minus side terminal of the fan motor 2 is connected through a series circuit 3 of resistors $R_1$, $R_2$ and $R_3$ and directly to a fan switch 4 made of a rotary switch and having five fixed contacts $C_1$ to $C_5$ and a rotatable contact $C_6$ which may be contacted with each of the fixed contacts $C_1$ to $C_5$.

More specifically, the minus side terminal of the motor 2 is connected to one end of the resistor $R_1$ and the fixed contacts $C_5$ of the fan switch 4. A conjunction between the resistors $R_1$ and $R_2$ is connected to the fixed contact $C_4$ of the switch 4 and the conjunction between the resistors $R_2$ and $R_3$ is connected to the fixed contact $C_3$. The other end of the resistor $R_3$ is connected to the fixed contact $C_2$ of the switch 4. The fixed contact $C_1$ is not used but the rotatable contact $C_6$ is contacted with the fixed contact $C_1$ in the condition shown in FIG. 1 where a voltage of the power supply 1 is not supplied to the motor and hence the motor is not operated. The rotatable contact $C_6$ is connected to ground. The negative pole of the power supply 1 is also connected to ground.

When the fan switch 4 is operated to cause the rotatable contact $C_6$ to be contacted with one of the fixed contacts $C_2$ to $C_5$, the fan motor 2 is supplied with the voltage of the power supply 1 and is operated to drive the electric fan. The magnitude of a stream of air sent into the room of the vehicle by the fan is determined on the basis of a position of one of the fixed contacts $C_2$ to $C_5$ with which the rotatable contact $C_6$ of the switch 4 is contacted. In other words, when the rotatable contact $C_6$ is contacted with the fixed contact $C_2$, the revolution of the motor 2 is minimum and a weakest stream of air is sent in the room since the voltage of the power supply 1 is supplied to the motor 2 through the resistors $R_1$, $R_2$ and $R_3$ connected in series and a minimum voltage is supplied to the motor 2 due to a voltage drop across the series-connected resistors R1, R2 and R3. When the contact $C_6$ is contacted with $C_3$, the revolution of the motor 2 is larger than that at a time when contacted with $C_2$ and a stream of air larger than that at a time when contacted with $C_2$ is sent in the room since the voltage of the supply 1 is supplied to the motor 2 through the resistors $R_1$ and $R_2$. When $C_6$ is contacted with $C_4$, the revolution of the motor 2 is larger than that at a time when contacted with $C_3$ and a stream of air larger than that at a time when contacted with $C_3$ is sent in the room since the voltage of the supply 1 is supplied to the motor 2 through the resistor $R_1$. When $C_6$ is contacted with $C_5$, the revolution of the motor 2 is maximum and a most powerful stream of air is sent in the room since the voltage of the power supply 1 is directly supplied to the motor 2 without a voltage drop by the resistors $R_1$, $R_2$ and $R_3$. In this manner, the stream of air may be adjusted in four stages from the weakest stream of air to the most powerful stream of air by manually operating the fan switch 4.

In such a prior art contoller, when the air conditioner is set in the cooling mode, there is no problem if the rotatable contact $C_6$ is contacted with the fixed contact $C_5$ and the most powerful stream of air is sent in the room of the vehicle. However, when the air conditioner is set in the heating mode and the most powerful stream of air is sent in the room by contacting the contact $C_6$ with the contact $C_5$, if a temperature of the outside air of the vehicle falls down to a cold temperature, the cold outside air is drawn into the room of the vehicle by operation of the electric fan together with the warm air from a heater of the air conditioner. Consequently, a temperature in the room is reduced and a desired room temperature can not be obtained. Therefore, in order to obtain the desired room temperature, it is necessary to manually operate the fan switch 4 depending on the outside temperature so that the controller drives the fan through the fan motor to send out a weaker stream of air into the room. Such a manual operation of the switch 4 is troublesome.

The present invention is successful to eliminate such a problem and is now described with reference to FIGS. 2-4.

Figure 2:
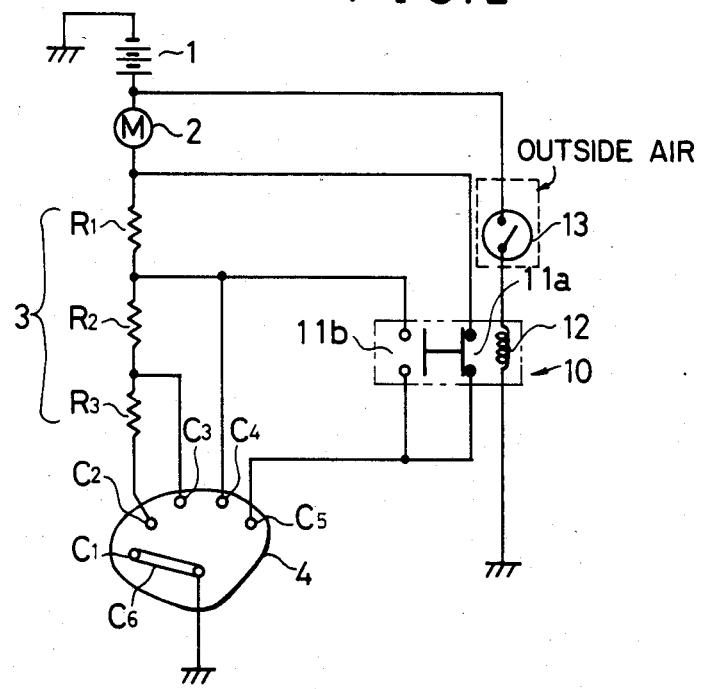
FIG. 2 is a circuit diagram of a controller for a fan motor of an air conditioner in a vehicle emboding the present invention.

Referring to FIG. 2, there is shown a first embodiment of the present invention. In FIG. 2, the same elements as shown in FIG. 1 are designated with the same reference numerals. Their description will not be taken up again in detail.

In this embodiment, the minus side terminal of the fan motor 2 is connected to the fixed contacts $C_5$ of the fan switch 4 through a normally closed contact 11a of a relay 10 and the conjunction between the resistors $R_1$ and $R_2$ is connected to the fixed contact $C_5$ through a normally opened contact 11b of the relay 10. One end of a coil 12 of the relay 10 is connected to the positive pole of the power supply 1 through an outside temperature sensitive switch 13 and the other end of the coil 12 is connected to ground. The temperature sensitive switch 13 is turned off, that is, opened when a temperature of the outside air is equal to or higher than 0° C., for example, and the switch 13 is turned on, that is closed when a temperature of the outside air is less than 0° C., for example.

Operation of the above embodiment is now described.

It is assumed that the air conditioner is set in the heating mode by an air conditioning switch (not shown) and the rotatable contact $C_6$ of the fan switch 4 is contacted with the fixed contact $C_5$ so that the most powerful stream of air is sent into the room. When a temperature of the outside air of the vehicle 13 is off or opened. Accordingly, since a current does not flow through the coil 12 of the relay 10 from the power supply 1, the relay 10 is not operated and its contact 11a is maintained closed. Thus, the fan motor 2 is applied with the voltage of the power supply 1 through the contact 11a of the relay 10 and the fixed contact $C_5$ and the rotatable contact $C_6$ of the fan switch 4 without through the resistors $R_1$, $R_2$ and $R_3$. Then the motor 2 is operated so that the revolution of the motor 2 becomes maximum and the most powerful stream of air is sent into the room. In this manner, when the outside temperature is high, the temperature in the room is not reduced if the most powerful stream of air is sent into the room.

However, when a temperature of the outside air falls down below 0° C., for example, the temperature sensitive switch 13 is turned on and closed. Since the relay 10 is energized by a current flowing through its coil 12 and the sensitive switch 13, the contact 11a of the relay 10 is opened and the contact 11b is closed. Consequently, the fan motor 2 is applied with the voltage of the power supply 1 through the resistor $R_1$, the contact 11b of the relay 10, the fixed contact $C_5$, and the rotatable contact $C_6$ of the fan switch 4. The voltage applied across the fan motor 2 is decreased as compared with that at the time when the relay 10 is not operated and the fan motor 2 is applied with the voltage of the supply 1 without through resistors. Thus, the motor 2 is operated so that the revolution of the motor 2 is reduced and a stream of air which is made weaker by one step than the most powerful stream of air is sent in the room. Accordingly, the temperature of air sent in the room does not fall down and the heating performance of the air conditioner can not be degraded in the heating mode.

Figure 3:
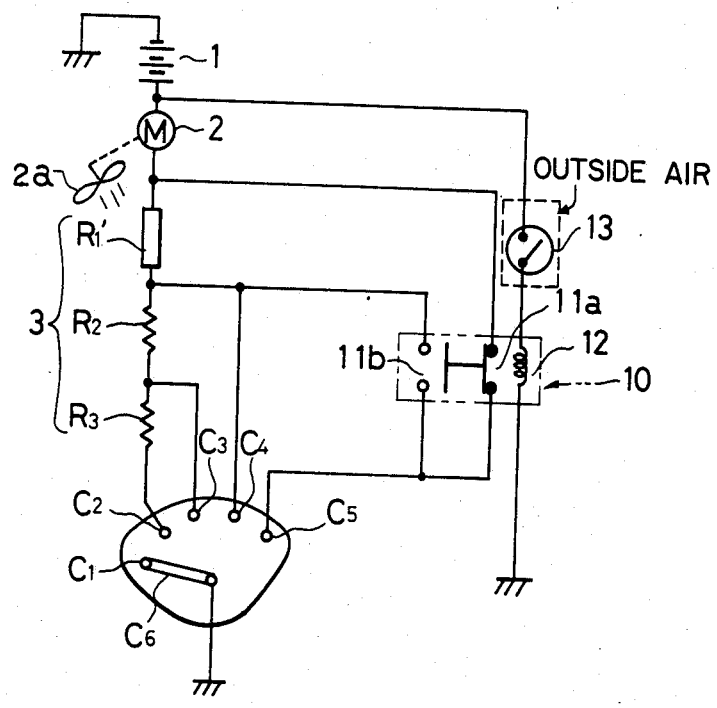
FIG. 3 is a circuit diagram of a second embodiment of a controller for a fan motor of an air conditioner in a vehicle according to the present invention.
Figure 4:
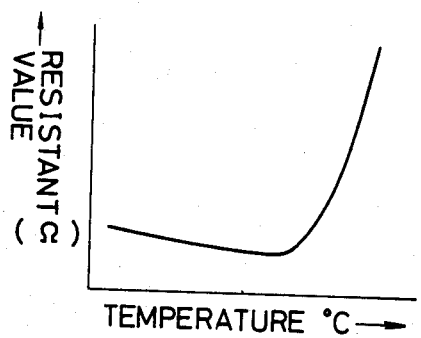
FIG. 4 is a graph showing a relation between a temperature and a resistance value of a resistance element having a positive temperature characteristic.

FIG. 3 shows a second embodiment of the present invention. In FIG. 3, the same elements as shown in FIG. 2 are designated with same reference numerals and their description will be omitted.

In the second embodiment of FIG. 3, a resistance element $R_1'$ having a positive temperature characteristic is used as a voltage control means instead of the resistor $R_1$ in the first embodiment. The resistance element $R_1'$ which is located so as to be exposed to air circulated by the fan 2a, possesses a positive temperature characteristic as shown in FIG. 4 such that when the ambient temperature surrounding the element $R_1'$ rises above a certain temperature, a resistance value of the element $R_1'$ is rapidly increased.

Resistance element $R_1'$ protects the fan in a situation when, for example, the rotatable contact $C_6$ of the fan switch 4 is contacted with the fixed contact $C_2, C_3, C_4$ or $C_5$ and a current flows through the resistance element $R_1'$ operate the fan motor 2, but the motor 2 is stopped due to some cause. Since the resistance element $R_1'$ is not cooled by air from the fan 2a driven by the motor 2, a temperature of the resistance element $R_1$ rises and the resistance value thereof is increased. Consequently, a current flowing through the resistance element $R_1'$ is reduced and generation of heat is prevented, so that damage by melting a casing and burning due to generation of heat are prevented.

Various modifications will become possible for those skilled in the art after receiving the teachings of the present disclosure without departing from the scope thereof.

What is claimed is:

1. A controller for a fan motor of an air conditioner in a vehicle in which the fan motor drives a blowing fan to send air into a room of the vehicle, comprising:
   adjusting means for changing the revolution of the motor to adjust the magnitude of a stream of air sent from the fan in a range from a powerful stream of air to a weak stream of air;

detection means for sensing a temperature of the air outside the room;

control means for reducing the magnitude of a stream of air from the fan when said detection means detects that the temperature of the outside air falls down below a predetermined temperature; and a resistance element having a positive temperature characteristic interposed between said fan motor and a power supply, said resistance element being exposed to air circulated by said fan.

2. A controller according to claim 1, wherein said adjusting means comprises a plurality of resistors connected in series to said motor and a fan switch which is operated to short each of said resistors so that the resistance value of said resistors connected in series to said motor is varied to change the revolution of said motor.

3. A controller according to claim 1, wherein said detection means comprises an outside temperature sensitive switch which is turned on when the outside temperature of the vehicle falls down below a predetermined temperature.

4. A controller according to claim 2, wherein said control means comprises relay means which is operated to release the short circuit by said fan switch so that the magnitude of a stream of air from the fan is reduced.

5. A controller according to claim 1, wherein said adjusting means is constructed to change the revolution of said motor in stages so that the magnitude of a stream of air from the fan is adjusted in stages from a powerful stream of air to a weak stream of air.

6. A controller according to claim 5, wherein said control means is operated to reduce the magnitude of a stream of air by one step when the temperature of the outside air falls down below a predetermined temperature.

7. A controller according to claim 2, wherein one of said plurality of resistors is said resistance element having a positive temperature characteristic.

8. A controller for a fan motor of an air conditioner in a vehicle in which the fan motor drives a blowing fan to send air into a room of the vehicle, comprising:

adjusting means for changing the operational speed of the motor by a multi-step change-over switch having resistors interposed between the switch and the motor;

detection means for sensing a temperature of the air outside the room; and means for interposing another resistor only between the motor and the terminal of the multi-step change-over switch corresponding to the position in which the motor operates at the highest operational speed, in response to the signal of the detection means detecting a temperature below a predetermined level.

9. A controller for a fan motor of an air conditioner in a vehicle in which the fan motor drives a blowing fan to send air into a room of the vehicle, comprising:

adjusting means for changing the revolution of the motor to adjust the magnitude of a stream of air sent from the fan in a range from a powerful stream of air to a weak stream of air;

detection means for sensing a temperature of the air outside the room; and control means for reducing the magnitude of a stream of air from the fan to prevent a reduction in temperature in the room of the vehicle when said detection means detects that the temperature of the outside air falls down below a predetermined temperature.

10. A controller according to claim 9, wherein said predetermined temperature is about 0° C.

* * * * *